(12) United States Patent
Xi

(10) Patent No.: US 8,717,002 B2
(45) Date of Patent: May 6, 2014

(54) CONSTANT ON-TIME CONVERTER AND CONTROL METHOD THEREOF

(75) Inventor: Xiaoyu Xi, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 13/538,045

(22) Filed: Jun. 29, 2012

(65) Prior Publication Data

US 2013/0002223 A1    Jan. 3, 2013

(30) Foreign Application Priority Data

Jun. 30, 2011    (CN) .......................... 2011 1 0181179

(51) Int. Cl.
*H02M 3/156*    (2006.01)

(52) U.S. Cl.
USPC ......................................................... 323/285

(58) Field of Classification Search
USPC ................ 323/282, 283, 284, 285, 286, 288
See application file for complete search history.

(56) References Cited

U.S. PATENT DOCUMENTS

| | | | |
|---|---|---|---|
| 2002/0125872 A1* | 9/2002 | Groom et al. | 323/288 |
| 2010/0019749 A1* | 1/2010 | Katsuya et al. | 323/282 |
| 2010/0134080 A1 | 6/2010 | Ouyang | |
| 2010/0164443 A1* | 7/2010 | Tumminaro et al. | 323/284 |
| 2010/0181983 A1 | 7/2010 | Ouyang | |
| 2011/0025284 A1 | 2/2011 | Xu | |

OTHER PUBLICATIONS

U.S. Appl. No 13/277,991, Yan Dong.

* cited by examiner

*Primary Examiner* — Gary L Laxton
*Assistant Examiner* — Alex Torres-Rivera
(74) *Attorney, Agent, or Firm* — Perkins Coie LLP

(57) ABSTRACT

A constant ON-time converter is disclosed. The constant ON-time converter comprises a feedback circuit, a slope compensation circuit and a buffer circuit. The feedback signal comprises an output configured to provide a feedback signal indicating an output voltage of the constant ON-time converter. The slope compensation circuit comprises an output configured to provide a slope compensation signal. The buffer circuit is coupled between the output of the feedback circuit and the output of the slope compensation circuit to avoid the feedback signal and the output voltage of the constant ON-time converter is influenced by the slope compensation signal.

12 Claims, 7 Drawing Sheets

US 8,717,002 B2

CONSTANT ON-TIME CONVERTER AND CONTROL METHOD THEREOF

CROSS-REFERENCE TO RELATED APPLICATION(S)

This application claims the benefit of CN application No. 201110181179.1, filed on Jun. 30, 2011, and incorporated herein by reference.

TECHNICAL FIELD

This invention relates generally to electrical circuits, and more particularly but not exclusively to constant ON-time converters.

BACKGROUND

Recently, constant ON-time converters are widely used per their fast transient response, simple structure and smooth operation mode switching.

FIG. 1 schematically illustrates a conventional constant ON-time converter 100. Constant ON-time converter 100 comprises an ON-time control circuit 101, a comparison circuit 102, a logic circuit 103, a switching circuit 104 and a feedback circuit 106. Switching circuit 104 comprises a switch and switching circuit 104 is configured to provide output signal OUT from input signal IN via turning ON and OFF the switch. ON-time control circuit 101 is configured to provide an ON-time period control signal COT to control an ON-time period of the switch. Feedback circuit 106 comprises an output configured to provide a feedback signal VFB indicating output signal OUT. Comparison circuit 102 comprises an output configured to provide a comparing signal via comparing feedback signal VFB with a reference signal VREF. Logic circuit 103 comprises a first input coupled to the output of comparison circuit 102, a second input coupled to ON-time control circuit 101 to receive ON-time period control signal COT and an output coupled to a control terminal of the switch to provide a control signal CTRL.

When an equivalent series resistance (ESR) of an output capacitor is small, a sub-harmonic oscillation may occur at output signal OUT, and constant ON-time converter 100 may be unstable. A slope compensation circuit 105 may be employed to avoid the sub-harmonic oscillation. Slope compensation circuit 105 comprises an output configured to provide a slope compensation signal VSLOPE. Comparison circuit 102 is configured to provide the comparing signal via comparing a sum of slope compensation signal VSLOPE and feedback signal VFB with reference signal VREF.

But feedback signal VFB and output signal OUT may be influenced by slope compensation circuit 105 per the output of slope compensation circuit 105 is coupled to the output of feedback circuit 106 directly. As a result, output accuracy of constant ON-time converter 100 needs to be improved.

SUMMARY

It is an object of the present disclosure to provide a constant ON-time converter with improved output accuracy and a control method thereof.

In one embodiment, a control circuit for a constant ON-time converter is disclosed. The constant ON-time converter may comprise a switching circuit, wherein the switching circuit may comprise a switch. The control circuit may comprise an ON-time control circuit, a slope compensation circuit, a buffer circuit, a comparison circuit and a logic circuit, wherein the ON-time control circuit is configured to provide an ON-time period control signal, the slope compensation circuit is configured to provide a slope compensation signal, the buffer circuit is configured to receive a feedback signal and provide a buffered signal, the comparison circuit is configured to provide a comparing signal via comparing a sum of the slope compensation signal and the buffered signal with a reference signal, and based on the comparing signal and the ON-time period control signal, the logic circuit is configured to provide a control signal coupled to a control terminal of the switch.

In one embodiment, a constant ON-time converter is disclosed. The constant ON-time converter may comprise a switching circuit having a switch, a feedback circuit and a control circuit, wherein the constant ON-time converter is configured to provide an output signal from an input signal via turning ON or OFF the switch, the feedback circuit is coupled to an output terminal of the constant ON-time converter and is configured to provide a feedback signal indicating the output signal, and the control circuit is coupled to the feedback circuit and the switching circuit. In one embodiment, the control circuit may comprise an ON-time control circuit, a slope compensation circuit, a buffer circuit, a comparison circuit and a logic circuit, wherein the ON-time control circuit is configured to provide an ON-time period control signal, the slope compensation circuit is configured to provide a slope compensation signal, the buffer circuit is coupled to the feedback circuit to receive the feedback signal and provide a buffered signal, the comparison circuit is configured to provide a comparing signal via comparing a sum of the slope compensation signal and the buffered signal with a reference signal, and based on the comparing signal and the ON-time period control signal, the logic circuit is configured to provide a control signal coupled to a control terminal of the switch.

In one embodiment, a control method for a constant ON-time converter is disclosed. The constant ON-time converter may comprise a switching circuit, wherein the switching circuit may comprise a switch. The control method may comprise: providing an ON-time period control signal; providing a buffered signal responsive to a feedback signal via a buffer circuit; providing a slope compensation signal; providing a comparing signal via comparing a sum of the slope compensation signal and the buffered signal with a reference signal; and controlling the switch based on the comparing signal.

In one embodiment, the buffer circuit may be employed to avoid the feedback circuit be directly coupled to the slope compensation circuit, and influence on the feedback signal and the output signal caused by the slope compensation signal may be reduced to improve output accuracy of the constant ON-time converter.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below with reference to constant ON-time converter and associated control method. As used hereinafter, the term "couple" generally refers to multiple ways including a direct connection with an electrical conductor and an indirect connection through intermediate diodes, resistors, capacitors, and/or other intermediaries. The term "switch" generally refers to a semiconductor device composed of semiconductor material with at least three terminals for connection to an external circuit.

Figure 1:
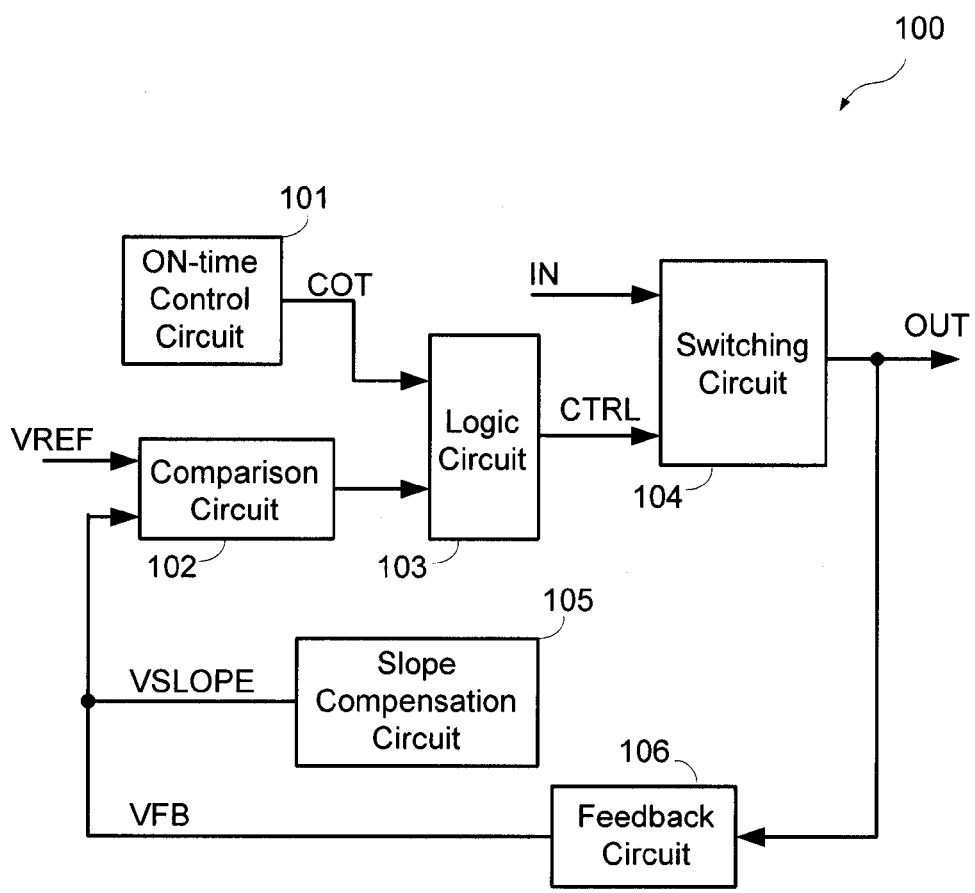
FIG. 1 schematically illustrates a conventional constant ON-time converter.
Figure 2:
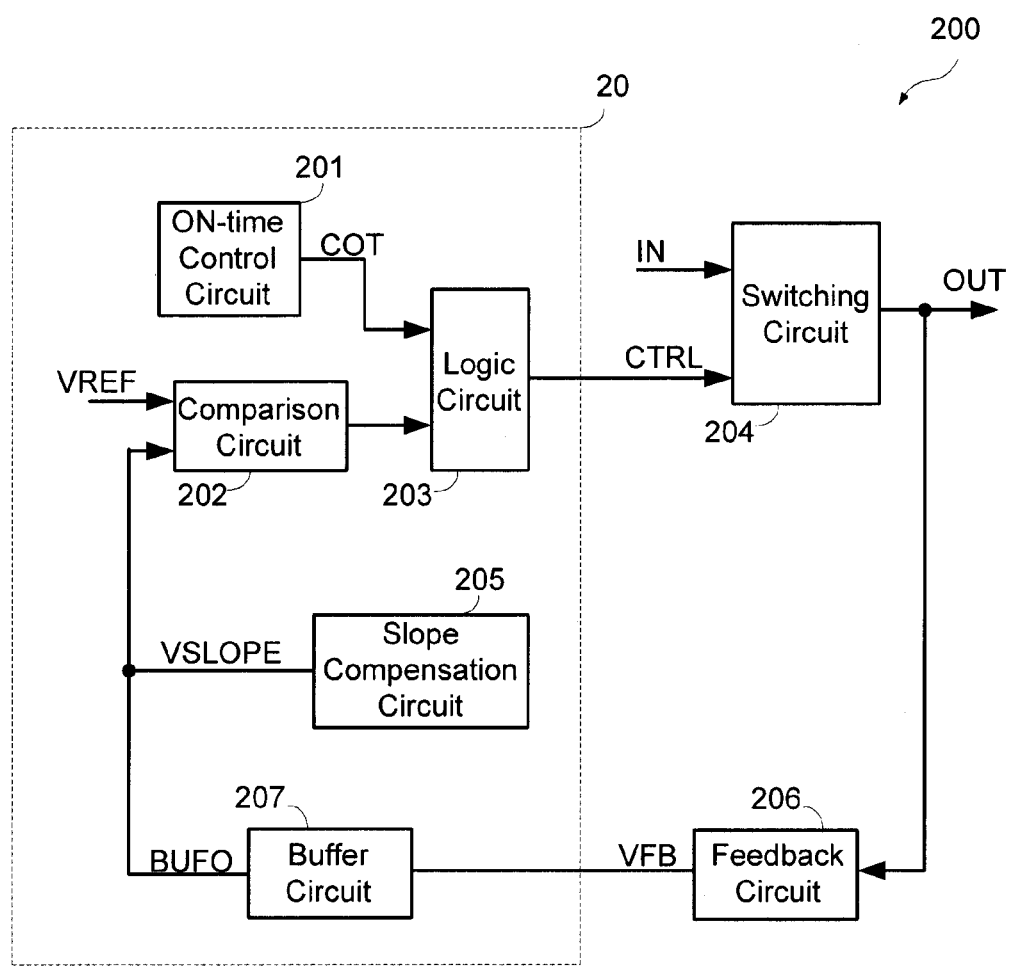
FIG. 2 illustrates a block diagram of a constant ON-time converter in accordance with an embodiment of the present invention.

FIG. 2 illustrates a block diagram of a constant ON-time converter 200 in accordance with an embodiment of the present invention. Constant ON-time converter 200 comprises a control circuit 20, a switching circuit 204 and a feedback circuit 206. Switching circuit 204 comprises a switch, and constant ON-time converter 200 comprises an input terminal configured to receive an input signal IN and an output terminal configured to provide an output signal OUT. Constant ON-time converter 200 is configured to provide output signal OUT from input signal IN via turning ON and OFF the switch. Input signal IN and output signal OUT may be current, voltage or power. Switching circuit 204 may adopt any direct current to direct current (DC/DC) circuit and alternating current to direct current (AC/DC) topology, such as step-up converter, step-down converter, forward converter, and flyback converter and so on. Feedback circuit 206 is configured to provide a feedback signal VFB indicating output signal OUT. Feedback circuit 206 may comprise a resistor divider or a sampling resistor.

Control circuit 20 comprises an ON-time control circuit 201, a comparison circuit 202, a logic circuit 203, a slope compensation circuit 205 and a buffer circuit 207. ON-time control circuit 201 is configured to provide an ON-time period control signal COT to control an ON-time period of the switch. Buffer circuit 207 is configured to provide buffered signal BUFO responsive to feedback signal VFB. Buffer circuit 207 has large input impedance, and slope compensation circuit 205 may have little influence on feedback signal VFB. Slope compensation circuit 205 is configured to provide a slope compensation signal VSLOPE. Comparison circuit 202 is configured to provide a comparing signal via comparing a sum of slope compensation signal VSLOPE and buffered signal BUFO with a reference signal VREF. Logic circuit 203 comprises a first input configured to receive ON-time period control signal COT, a second input configured to receive the comparing signal, and an output coupled to a control terminal of the switch to provide a control signal CTRL.

Buffer circuit 207 is coupled between feedback circuit 206 and slope compensation circuit 205 to avoid feedback signal VFB influenced by an output of slope compensation circuit 205, and as a result output accuracy of constant ON-time converter 200 is improved.

Figure 3:
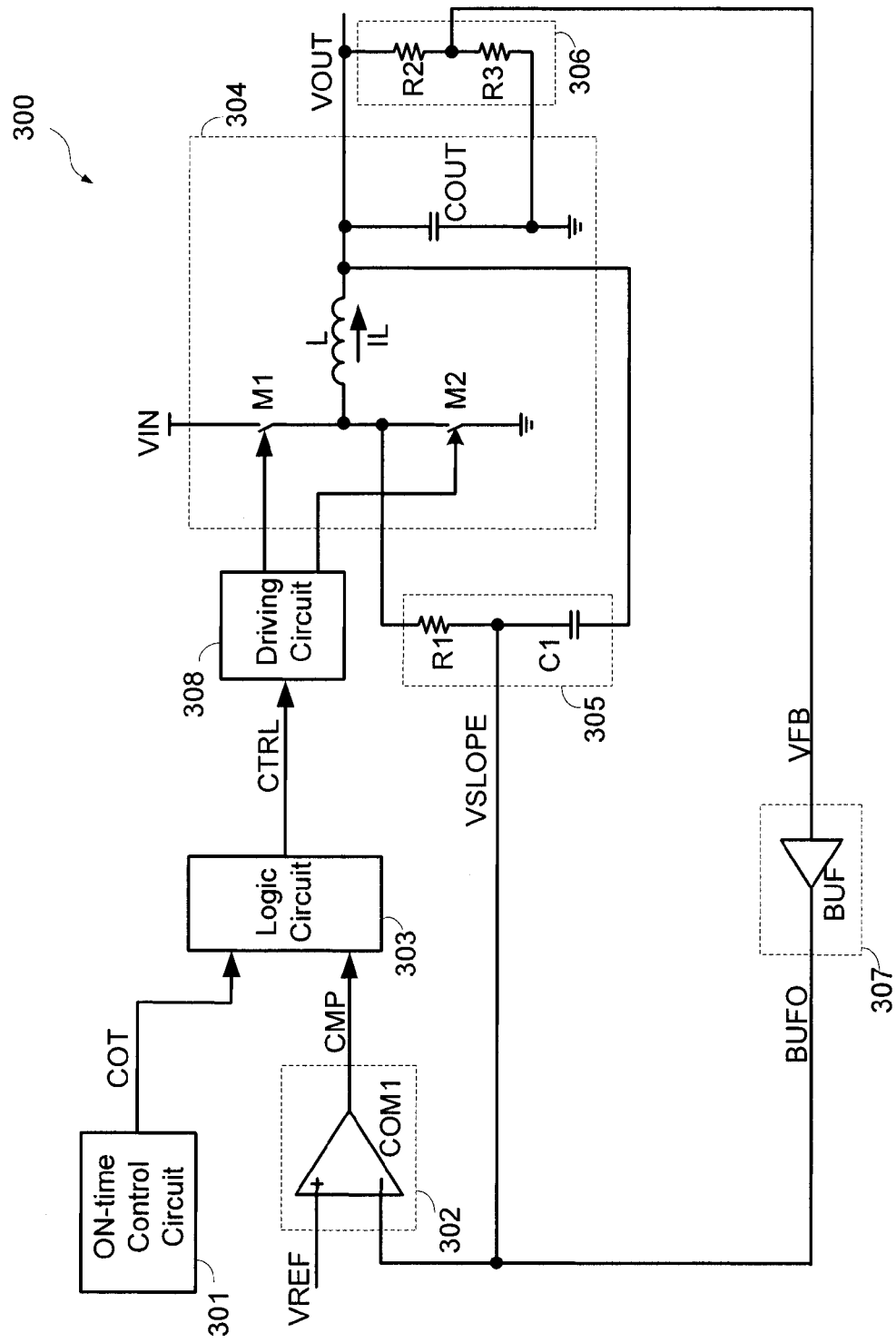
FIG. 3 schematically illustrates a constant ON-time converter in accordance with an embodiment of the present invention.

FIG. 3 schematically illustrates a constant ON-time converter 300 in accordance with an embodiment of the present invention. Constant ON-time converter 300 comprises an ON-time control circuit 301, a comparison circuit 302, a logic circuit 303, a switching circuit 304, a slope compensation circuit 305, a feedback circuit 306 and a buffer circuit 307.

Switching circuit 304 adopts synchronous step-down topology as an example. Switching circuit 304 comprises a switch M1, a switch M2, an inductor L and an output capacitor COUT. Constant ON-time converter 300 is configured to provide an output voltage VOUT from an input voltage VIN via turning ON and OFF switch M1 and switch M2. Switch M1 comprises a first terminal coupled to input voltage VIN, a second terminal and a control terminal. Switch M2 comprises a first terminal coupled to the second terminal of switch M1, a second terminal coupled to a system ground and a control terminal. A first terminal of inductor L is coupled to the second terminal of switch M1 and the first terminal of switch M2, a second terminal of inductor L is coupled to a first terminal of output capacitor COUT, and a second terminal of output capacitor COUT is coupled to the system ground. Voltage across output capacitor COUT is output voltage VOUT.

Slope compensation circuit 305 comprises an output configured to provide slope compensation signal VSLOPE. Slope compensation signal VSLOPE may simulate as an ESR of output capacitor COUT. In one embodiment, after switch M1 is turned ON, slope compensation signal VSLOPE increases gradually, and when switch M1 is turned OFF, slope compensation signal VSLOPE decrease gradually. In one embodiment, slope compensation signal VSLOPE is in phase with ripple of a current IL flowing through inductor L. Slope compensation signal VSLOPE may be proportional to ripple of current IL. In one embodiment, slope compensation circuit 305 comprises a resistor R1 and a capacitor C1. Resistor R1 comprises a first terminal coupled to the second terminal of switch M1 and the first terminal of switch M2, and a second terminal. Capacitor C1 comprises a first terminal coupled to the second terminal of resistor R1, and a second terminal coupled to output voltage VOUT. Voltage at the first terminal of capacitor C1 is slope compensation signal VSLOPE.

Feedback circuit 306 comprises an input coupled to output voltage VOUT and an output configured to provide feedback signal VFB. In one embodiment, feedback circuit 306 comprises a resistor divider comprising a resistor R2 and a resistor R3. Buffer circuit 307 comprises an input coupled to the output of feedback circuit 306 and an output configured to provide buffered signal BUFO. In one embodiment, buffer circuit 307 comprises a buffer BUF. An input of buffer BUF is coupled to the output of feedback circuit 306 to receive feedback signal VFB, and an output of buffer BUF is configured to provide buffered signal BUFO. In one embodiment, buffer BUF is a unity-gain buffer, i.e., it has a voltage gain of one. In another embodiment, voltage gain of buffer BUF may be other value.

Comparison circuit 302 comprises a first input coupled to the output of slope compensation circuit 305 and the output of buffer circuit 307, a second input configured to receive reference signal VREF, and an output configured to provide a comparing signal CMP. In one embodiment, comparison circuit 302 comprises a comparator COM1. Comparator COM1 comprises an inverting input coupled to the output of slope compensation circuit 305 and the output of buffer circuit 307 to receive the sum of buffered signal BUFO and slope compensation signal VSLOPE, a non-inverting input configured to receive reference signal VREF and an output configured to provide comparing signal CMP.

ON-time control circuit 301 comprises an output configured to provide ON-time period control signal COT to control an ON-time period of switch M1 or an ON-time period of switch M2. Logic circuit 303 comprises a first input coupled to the output of ON-time control circuit 301, a second input coupled to the output of comparison circuit 302, and an output configured to provide control signal CTRL. Constant ON-time converter 300 may further comprise a driving circuit 308 having an input coupled to the output of logic circuit 303 to receive control signal CTRL, a first output coupled to the control terminal of switch M1 and a second output coupled to the control terminal of switch M2.

In one embodiment, when the sum of buffered signal BUFO and slope compensation signal VSLOPE is less than reference signal VREF, switch M1 is turned ON and switch M2 is turned OFF until ON-time period of switch M1 is expired.

Figure 4:
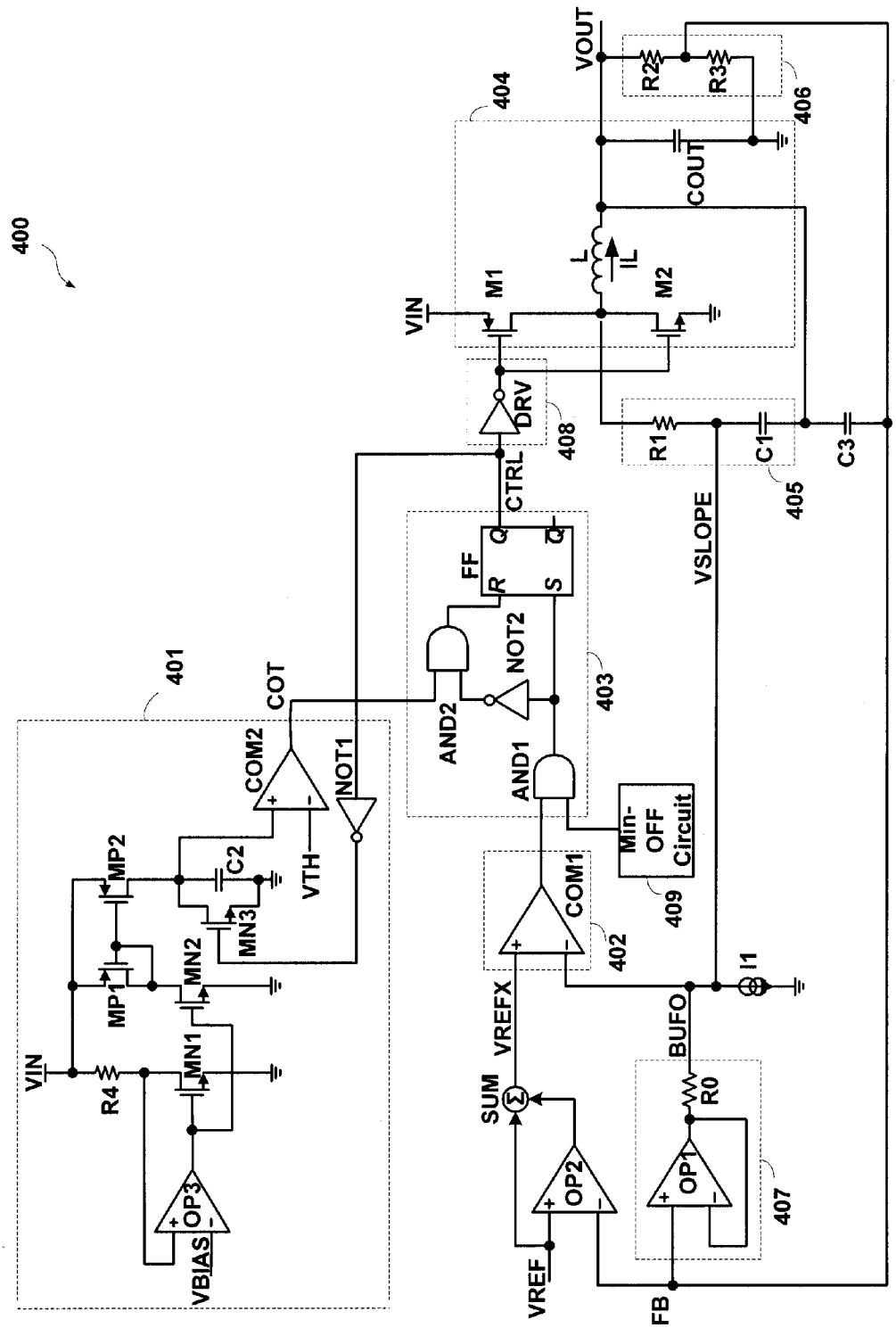
FIG. 4 schematically illustrates a constant ON-time converter in accordance with another embodiment of the present invention.

FIG. 4 schematically illustrates a constant ON-time converter 400 in accordance with another embodiment of the present invention. Constant ON-time converter 400 comprises an ON-time control circuit 401, a comparison circuit 402, a logic circuit 403, a switching circuit 404, a slope compensation circuit 405, a feedback circuit 406 and a buffer circuit 407. Similarly, comparison circuit 402, switching circuit 404, slope compensation circuit 405 and feedback circuit 406 are basically the same as corresponding circuits shown in FIG. 3. Buffer circuit 407 comprises a unity-gain buffer BUF. Unity-gain buffer BUF comprises an amplifier OP1 having a non-inverting terminal coupled to an output of feedback circuit 406 to receive feedback signal VFB, an inverting terminal and an output, wherein the inverting terminal is coupled to the output and the output is configured to provide buffered signal BUFO.

In one embodiment, output impedance of buffer circuit 407 equals output impedance of feedback circuit 406. In one embodiment, buffer circuit 407 comprises a resistor R0 serial with buffer BUF. A first terminal of resistor R0 is coupled to the output of amplifier OP1 and a second terminal of resistor R0 is configured to provide buffered signal BUFO. Resistance of resistor R0 equals output impedance of feedback circuit 406, for example R2*R3/(R2+R3).

In one embodiment, ON-time control circuit 401 comprises a switch MP1, a switch MP2, a switch MN1, a switch MN2, a switch MN3, an amplifier OP3, a resistor R4, a comparator COM2 and a NOT gate NOT1. One terminal of resistor R4 is coupled to input voltage VIN, the other terminal of resistor R4 is coupled to a non-inverting terminal of amplifier OP3 and drain of switch MN1. An inverting terminal of amplifier OP3 is coupled to a bias voltage VBIAS, and an output of amplifier OP3 is coupled to gate of switch MN1 and gate of switch MN2. Source of switch MN1 and source of switch MN2 are coupled to the system ground. Source of switch MP1 and source of switch MP2 are coupled to input voltage VIN, gate of switch MP1 and gate of switch MP2 are coupled to drain of switch MP1. Drain of switch MP1 is coupled to drain of switch MN2. Drain of switch MN3 is coupled to drain of switch MP2, and source of switch MN3 is coupled to the system ground. Capacitor C2 is coupled in parallel with switch MN3. One terminal of capacitor C2 is coupled to drain of switch MN3 and the other terminal of capacitor C2 is coupled to source of switch MN3. NOT gate NOT1 comprises an input configured to receive control signal CTRL and an output coupled to gate of switch MN3. Comparator COM2 comprises a non-inverting terminal coupled to drain of switch MN3, an inverting terminal configured to receive a threshold signal VTH, and an output configured to provide ON-time period control signal COT.

Switch MN1 and switch MN2 are employed as a first current mirror, and switch MP1 and switch MP3 are employed as a second current mirror. In one embodiment, width to length ratio of switch MN1 and switch MN2 is about 1:n, and width to length ratio of switch MP1 and switch MP3 is about 1:m, where n and m are positive constant value. Current flowing through switch MN1 is about (VIN−VBIAS)/R4 and current flowing through switch MP2 is about n*m*(VIN−VBIAS)/R4. In one embodiment, threshold signal VTH equals output voltage VOUT.

Logic circuit 403 comprises reset-set (RS) flip-flop FF. Flip-flop FF comprises a reset terminal configured to receive ON-time period control signal COT, a set terminal coupled to the output of comparator COM1, and a non-inverting output terminal configured to provide control signal CTRL. Driving circuit 408 comprises a driver DRV. Driver DRV comprises an input configured to receive control signal CTRL, a first output coupled to the control terminal of switch M1 and a second output coupled to the control terminal of switch M2.

In one embodiment, ESR of output capacitor LOUT may introduce a DC error between output voltage VOUT and reference signal VREF. An error compensation unit comprising an amplifier OP2 and an adder SUM is employed to reduce the DC error between output voltage VOUT and reference signal VREF. Comparison circuit 402 is configured to receive reference signal VREF via amplifier OP2 and adder SUM. Amplifier OP2 comprises a non-inverting terminal configured to receive reference signal VREF, an inverting terminal configured to receive feedback signal VFB, and an output. Adder SUM comprises a first input configured to receive reference signal VREF, a second input coupled to the output of amplifier OP2, and an output coupled to comparison circuit 402 to provide a reference signal VREFX.

Figure 5:
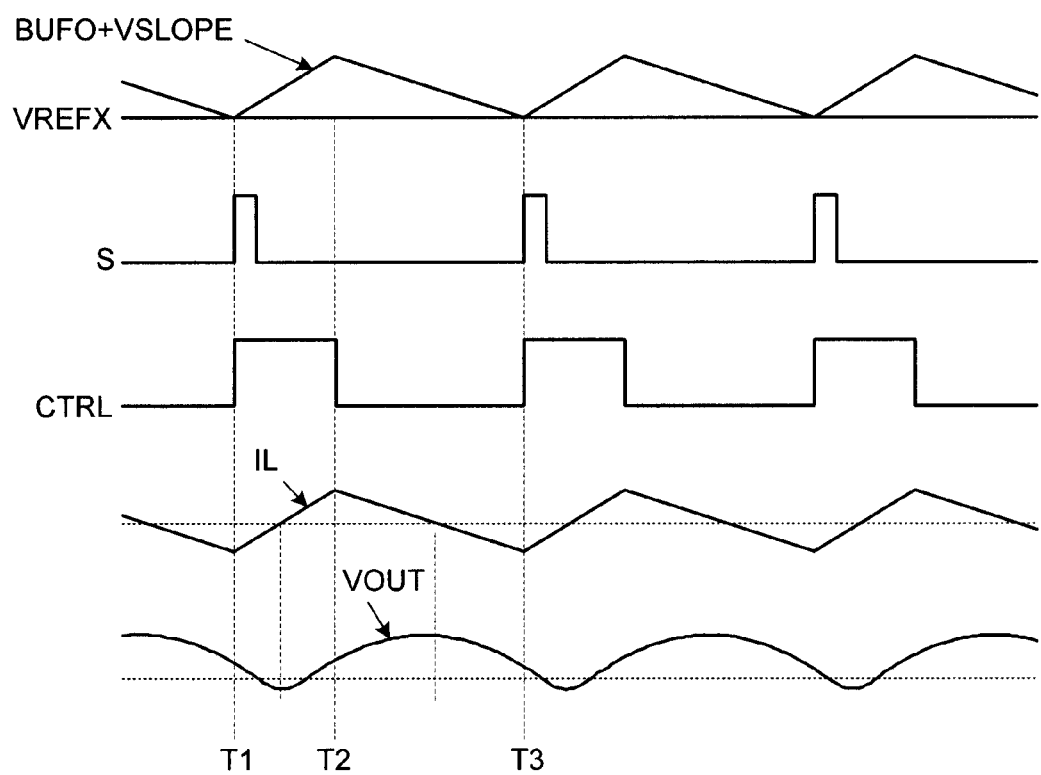
FIG. 5 shows waveforms illustrating signals of the constant ON-time converter shown in FIG. 4 in accordance with an embodiment of the present invention.

FIG. 5 shows waveforms illustrating signals of the constant ON-time converter shown in FIG. 4 in accordance with an embodiment of the present invention. When switch M1 is turned ON and switch M2 is turned OFF at time T1, current IL increases gradually and the sum of buffered signal BUFO and slope compensation signal VSLOPE increases gradually. Switch MN3 is turned OFF and capacitor C2 is charged via a current flowing through switch MP2. When voltage across capacitor C2 is increased larger than threshold signal VTH, ON-time period control signal COT becomes HIGH level. And then flip-flop FF is reset to turn OFF switch M1 and turn ON switch M2 at time T2, switch MN3 is turned ON, capacitor C2 is discharged rapidly to about zero volts. Current IL decreases gradually and the sum of buffered signal BUFO and slope compensation signal VSLOPE decrease gradually. When the sum of buffered signal BUFO and slope compensation signal VSLOPE is decreased less than reference signal VREFX, flip-flop FF is set to turn ON switch M1 and turn OFF switch M2 and switch MN3 at time T3.

In one embodiment, a current source I1 is employed as shown in FIG. 4. Current source I1 is coupled between an output of slope compensation circuit 405 and the system ground. Current source I1 may be employed to balance an effective DC current introduced by slope compensation circuit 405. In one embodiment, current source I1 is configured to provide a current about (VOUT−VFB)/R1.

In one embodiment, capacitor C3 is employed to provide feed-forward as shown in FIG. 4. One terminal of capacitor C3 is coupled to output voltage VOUT and the other terminal of capacitor C3 is coupled to the output of feedback circuit 406.

In one embodiment, a minimum-OFF time circuit 409 is employed to avoid turning ON switch M1 by mistake after switch M1 is turned OFF. During a minimum-OFF time period, logic circuit 403 is not responsive to comparison circuit 402. In one embodiment, logic circuit 403 further comprises an AND gate AND1. AND gate AND1 comprises a first input coupled to an output of minimum-OFF time circuit 409, a second input coupled to an output of comparison circuit 402 and an output coupled to the set terminal of flip-flop FF.

In one embodiment, logic circuit 403 further comprises a NOT gate NOT2 and an AND gate AND2. NOT gate NOT2 comprises an input coupled to the output of AND gate AND1. AND gate AND2 comprises a first input coupled to the output of NOT gate NOT2, a second input coupled to the output of ON-time period control circuit 401 and an output coupled to the reset terminal of flip-flop FF. When the sum of buffered signal BUFO and slope compensation signal VSLOPE is less than reference signal VREFX, ON-time period control signal COT is blanked, and switch M1 maintains ON and switch M2 maintains OFF. As a result, transient response is improved when load steps up.

Figure 6:
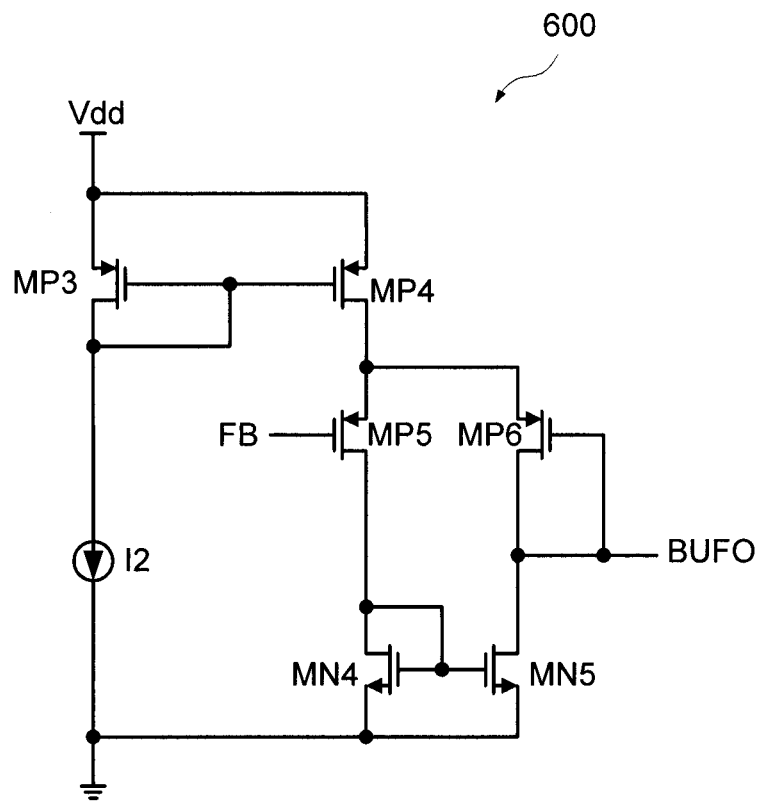
FIG. 6 schematically illustrates a unity-gain buffer circuit of the constant ON-time converter shown in FIG. 4 in accordance with an embodiment of the present invention.

FIG. 6 schematically illustrates a unity-gain buffer circuit 600 of constant ON-time converter 400 shown in FIG. 4 in accordance with an embodiment of the present invention. Unity-gain buffer circuit 600 comprises a switch MP3, a switch MP4, a switch MP5, a switch MP6, a switch MN4, a switch MN5 and a current source I2. Gate of switch MP5 is configured to receive feedback signal VFB. Gate of switch MP6 is coupled to drain of switch MP6 to provide buffered signal BUFO.

Figure 7:
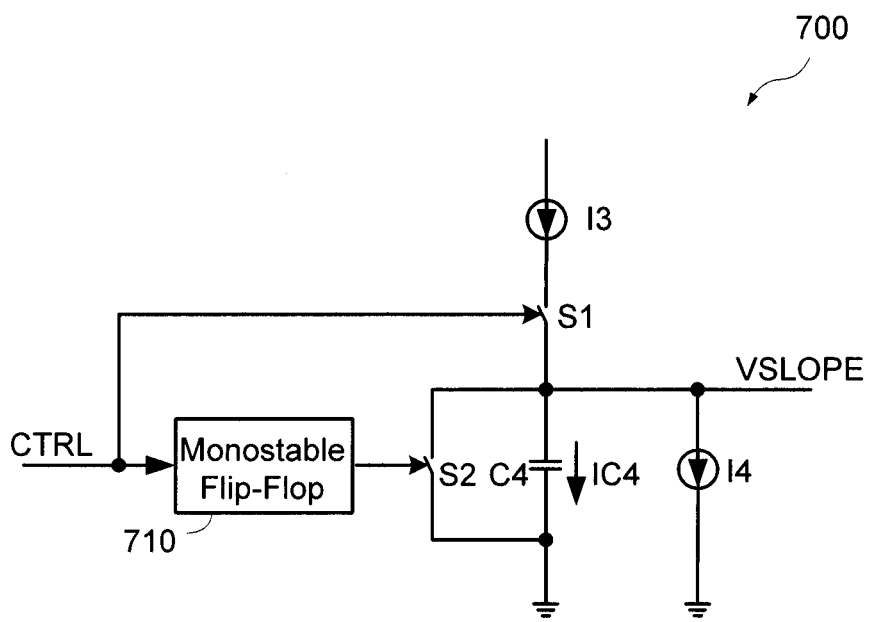
FIG. 7 schematically illustrates a slope compensation circuit of the constant ON-time converter shown in FIG. 3 in accordance with an embodiment of the present invention.

FIG. 7 schematically illustrates a slope compensation circuit 700 of constant ON-time converter 300 shown in FIG. 3 in accordance with an embodiment of the present invention. Slope compensation circuit 700 comprises a monostable Flip-Flop 710, a switch S1, a switch S2, a current source I3, a current source I4 and a capacitor C4. Monostable Flip-Flop 710 comprises an input configured to receive control signal CTRL and an output. Switch S1 comprises a first terminal coupled to current source I3, a second terminal, and a control terminal configured to receive control signal CTRL. Switch S2 comprises a first terminal coupled to the second terminal of switch S1, a second terminal coupled to the system ground, and a control terminal coupled to the output of monostable Flip-Flop 710. Capacitor C4 comprises a first terminal coupled to the first terminal of switch S2 and a second terminal coupled to the second terminal of switch S2. One terminal of current source I4 is coupled to the first terminal of switch S2, the other terminal of current source I4 is coupled to the system ground. Current source I3 is configured to provide a current proportional to input voltage VIN. Current source I4 is configured to provide a current proportional to output voltage VOUT. Voltage at the first terminal of capacitor C4 is slope compensation signal VSLOPE.

Figure 8:
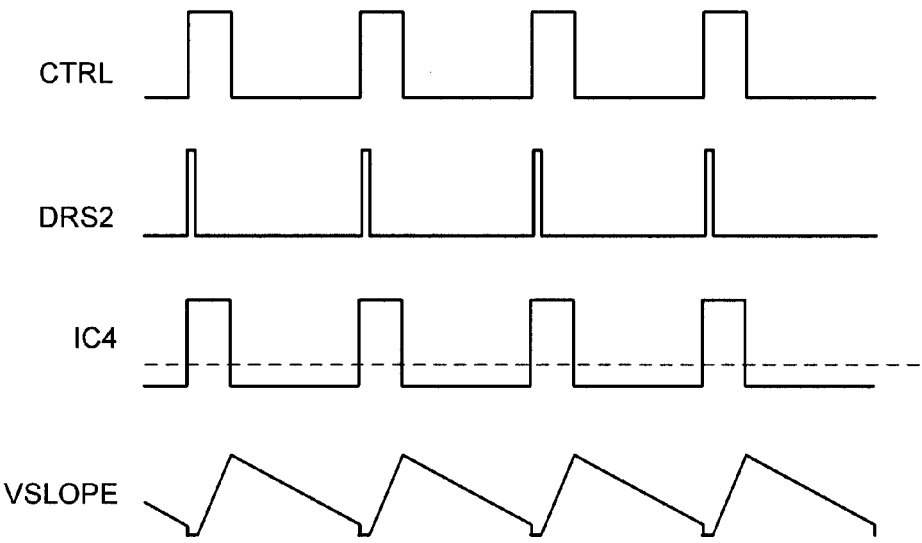
FIG. 8 shows waveforms illustrating signals of the slope compensation circuit shown in FIG. 7 in accordance with an embodiment of the present invention.

FIG. 8 shows waveforms illustrating signals of slope compensation circuit 700 shown in FIG. 7 in accordance with an embodiment of the present invention. When control signal CTRL becomes HIGH, switch S1 is turned ON, and monostable Flip-Flop 710 is configured to provide a pulse signal DRS2 to turn ON switch S2 within a time period. Capacitor C4 is discharged and slope compensation signal VSLOPE decreases to about zero volts via switch S2. Capacitor C4 is charged via current source I3 after switch S2 is turned OFF. A current IC4 flowing through capacitor C4 is about I3-I4, and slope compensation signal VSLOPE increases gradually. When control signal CTRL becomes LOW, switch S1 is turned OFF, current source I3 is disconnected to capacitor C4. Capacitor C4 is discharged via current source I4, and slope compensation signal VSLOPE decreases gradually.

Figure 9:
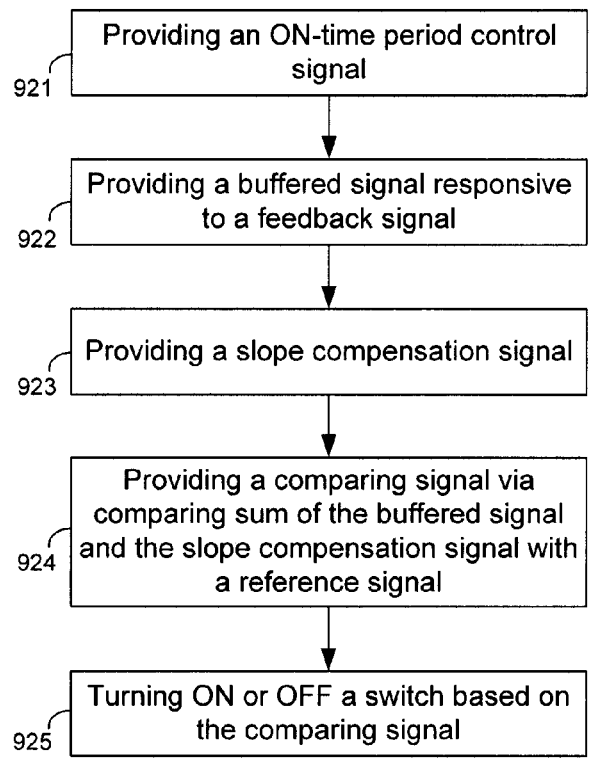
FIG. 9 shows a flow chart illustrating a control method for a constant ON-time converter in accordance with an embodiment of the present invention.

FIG. 9 is a flow chart illustrating a control method for a constant ON-time converter in accordance with an embodiment of the present invention. The constant ON-time converter comprises a switching circuit. The switching circuit comprises a first switch. The control method comprises stages 921-925.

At stage 921, providing an ON-time period control signal.

At stage 922, providing a buffered signal responsive to a feedback signal, wherein the feedback signal indicating an output voltage of the constant ON-time converter.

At stage 923, providing a slope compensation signal.

At stage 924, providing a comparing signal via comparing a sum of the buffered signal and the slope compensation signal with a reference signal.

At stage 925, turning ON or OFF the first switch based on the comparing signal.

In one embodiment, a buffer circuit comprising a buffer is employed to provide the buffered signal. The buffer may be a unity-gain buffer or a non-unity-gain buffer. In one embodiment, the buffer comprises an amplifier having an inverting terminal, a non-inverting terminal and an output, wherein the non-inverting terminal is configured to receive the feedback signal, the inverting terminal is coupled to the output, and the output is configured to provide the buffered signal.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A control circuit for a constant ON-time converter, the constant ON-time converter having an input terminal and an output terminal configured to provide an output voltage, wherein the constant ON-time converter comprising a first switch, the first switch having a first terminal, a second terminal and a control terminal, wherein the first terminal is coupled to the input terminal of the constant ON-time converter, and wherein the control circuit comprising:
    an ON-time control circuit, having an output configured to provide an ON-time period control signal;
    a slope compensation circuit, having an output configured to provide a slope compensation signal, wherein the slope compensation signal is configured to increase after the control signal transitions into a first state and the slope compensation signal is configured to decrease after the control signal transitions into a second state;

a buffer circuit, having an input and an output, wherein the input is configured to receive a feedback signal, wherein the output is configured to provide a buffered signal, and wherein the feedback signal is based on the output voltage provided by the output terminal of the ON-time converter;

a comparison circuit, having a first input, a second input and an output, wherein the first input is coupled to the output of the slope compensation circuit and the output of the buffer circuit, wherein the second input is configured to receive a reference signal, and wherein the output is configured to provide a first comparing signal; and a logic circuit, having a first input, a second input and an output, wherein the first input is coupled to the output of the ON-time control circuit, wherein the second input is coupled to the output of the comparison circuit, and wherein the output is coupled to the control terminal of the first switch to provide a control signal; and wherein the slope compensation circuit further comprises:

a first current source, having an output;

a second switch, having a first terminal, a second terminal and a control terminal, wherein the first terminal is coupled to the output of the first current source, and wherein the control terminal is coupled to the output of the logic circuit;

a monostable Flip-Flop, having an input and an output, wherein the input is coupled to the output of the logic circuit;

a third switch, having a first terminal, a second terminal and a control terminal, wherein the first terminal is coupled to the second terminal of the second switch, wherein the second terminal is coupled to a system ground, and wherein the control terminal is coupled to the output of the monostable Flip-Flop;

a third capacitor, having a first terminal and a second terminal, wherein the first terminal is coupled to the second terminal of the second switch to provide the slope compensation signal, and wherein the second terminal is coupled to the system ground; and a second current source, having a first terminal and a second terminal, wherein the first terminal is coupled to the first terminal of the third capacitor, and wherein the second terminal is coupled to the system ground; and wherein when the control signal is at the first state, the third capacitor is charged via the first current source and the second current source, and when the control signal is at the second state, the third capacitor is discharged via the second current source.

2. The control circuit of claim 1, wherein the buffer circuit further comprises a buffer, the buffer having an input and an output, wherein the input is configured to receive the feedback signal.

3. The control circuit of claim 2, wherein the buffer circuit further comprises a first resistor, the first resistor having a first terminal and a second terminal, wherein the first terminal is coupled to the output of the buffer, and wherein the second terminal is configured to provide the buffered signal.

4. The control circuit of claim 2, wherein the buffer further comprises a first amplifier, the first amplifier comprising a non-inverting terminal, an inverting terminal and an output, wherein the non-inverting terminal is configured to receive the feedback signal, wherein the inverting terminal is coupled to the output of the first amplifier, and wherein the output is coupled to the output of the buffer circuit.

5. The control circuit of claim 1, wherein the control circuit further comprises a first capacitor, the first capacitor comprising a first terminal and a second terminal, wherein the first terminal is coupled to the output terminal of the constant ON-time converter, and wherein the second terminal is coupled to the input of the buffer circuit.

6. The control circuit of claim 1, wherein the control circuit further comprises a third current source having a first terminal and a second terminal, wherein the first terminal is coupled to the output of the slope compensation circuit, and wherein the second terminal is coupled to a system ground.

7. The control circuit of claim 1, wherein the control circuit further comprises an error compensation unit, the error compensation unit comprising:

a second amplifier, having a non-inverting terminal, an inverting terminal and an output, wherein the non-inverting terminal is configured to receive the reference signal, wherein the inverting terminal is configured to receive the feedback signal, and wherein the output is configured to provide an error amplifying signal; and an adder, having a first input, a second input and an output, wherein the first input is coupled to the output of the second amplifier to receive the error amplifying signal, wherein the second input is configured to receive the reference signal, and wherein the output is coupled to the second input of the comparison circuit.

8. A constant ON-time converter having an input terminal and an output terminal, the constant ON-time converter comprising:

a switching circuit, comprising a first switch having a first terminal, a second terminal and a control terminal, wherein the first terminal is coupled to the input terminal of the constant ON-time converter;

a feedback circuit, having an input and an output, wherein the input is coupled to the output terminal of the constant ON-time converter, and wherein the output is configured to provide a feedback signal; and a control circuit, comprising:

an ON-time control circuit, having an output configured to provide an ON-time period control signal;

a slope compensation circuit, having an output configured to provide a slope compensation signal, wherein the slope compensation signal is configured to increase after the control signal transitions into a first state and the slope compensation signal is configured to decrease after the control signal transitions into a second state;

a buffer circuit, having an input and an output, wherein the input is configured to receive the feedback signal, and wherein the output is configured to provide a buffered signal;

a comparison circuit, having a first input, a second input and an output, wherein the first input is coupled to the output of the slope compensation circuit and the output of the buffer circuit, wherein the second input is configured to receive a reference signal, and wherein the output is configured to provide a first comparing signal; and a logic circuit, having a first input, a second input and an output, wherein the first input is coupled to the output of the ON-time control circuit, wherein the second input is coupled to the output of the comparison circuit, and wherein the output is coupled to a control terminal of the first switch to provide a control signal;

wherein the slope compensation circuit further comprises:

a first current source, having an output;

a second switch, having a first terminal, a second terminal and a control terminal, wherein the first terminal is coupled to the output of the first current source, and wherein the control terminal is coupled to the output of the logic circuit;

a monostable Flip-Flop, having an input and an output, wherein the input is coupled to the output of the logic circuit;

a third switch, having a first terminal, a second terminal and a control terminal, wherein the first terminal is coupled to the second terminal of the second switch, wherein the second terminal is coupled to a system ground, and wherein the control terminal is coupled to the output of the monostable Flip-Flop;

a third capacitor, having a first terminal and a second terminal, wherein the first terminal is coupled to the second terminal of the second switch to provide the slope compensation signal, and wherein the second terminal is coupled to the system ground; and a second current source, having a first terminal and a second terminal, wherein the first terminal is coupled to the first terminal of the third capacitor, and wherein the second terminal is coupled to the system ground; and wherein when the control signal is at the first state, the third capacitor is charged via the first current source and the second current source, and when the control signal is at the second state, the third capacitor is discharged via the second current source.

9. The constant ON-time converter of claim 8, wherein the switching circuit further comprises:

a second switch, having a first terminal, a second terminal and a control terminal, wherein the first terminal is coupled to the second terminal of the first switch, wherein the second terminal is coupled to a system ground, and wherein the control terminal is coupled to the output of the logic circuit;

an inductor, having a first terminal and a second terminal, wherein the first terminal is coupled to the second terminal of the first switch; and an output capacitor, having a first terminal and a second terminal, wherein the first terminal is coupled to the second terminal of the inductor, wherein the second terminal is coupled to the system ground, and wherein the first terminal is coupled to the output terminal of the constant ON-time converter.

10. The constant ON-time converter of claim 8, wherein the control circuit further comprises a second capacitor having a first terminal and a second terminal, wherein the first terminal is coupled to the output terminal of the constant ON-time converter, and wherein the second terminal is coupled to the input of the buffer circuit.

11. The constant ON-time converter of claim 8, wherein the buffer circuit further comprises an amplifier, the amplifier having a non-inverting terminal, an inverting terminal and an output, wherein the non-inverting terminal is coupled to the output terminal of the feedback circuit, wherein the inverting terminal is coupled to the output of the amplifier, and wherein the output is coupled to the output of the buffer circuit to provide the buffered signal.

12. The constant ON-time converter of claim 11, wherein the buffer circuit further comprises a second resistor, the second resistor having a first terminal and a second terminal, wherein the first terminal is coupled to the output of the amplifier, and wherein the second terminal is configured to provide the buffered signal.

* * * * *